United States Patent [19]
Halvorsen et al.

[11] 3,757,949
[45] Sept. 11, 1973

[54] LIQUID FILTER DEVICE

[75] Inventors: Elmer F. Halvorsen, Indianapolis; Harold R. Byrd, Lebanon, both of Ind.

[73] Assignee: The Carborundum Company, Niagara Falls, N.Y.

[22] Filed: June 24, 1971

[21] Appl. No.: 156,254

[52] U.S. Cl. .............................. 210/122, 210/387
[51] Int. Cl. .................................................. B01d 35/08
[58] Field of Search .................. 210/122, 232, 160, 210/387, 401

[56] References Cited
UNITED STATES PATENTS

| | | |
|---|---|---|
| 2,665,812 | 1/1954 | Crane .......................... 210/387 X |
| 1,559,535 | 10/1925 | Roddy et al. ..................... 210/160 |
| 3,091,336 | 5/1963 | Hirs .............................. 210/387 X |
| 2,851,163 | 9/1958 | Anderson ......................... 210/387 |
| 3,581,896 | 6/1971 | Kuhlman ......................... 210/387 X |

Primary Examiner—Frank A. Spear, Jr.
Attorney—Robert E. Walker and David E. Dougherty

[57] ABSTRACT

In a liquid filter device, a tank for receiving filtered liquid has a frame disposed therein and pivotably mounted at one end thereof. Rollers mounted at each end of the frame support a driven conveyor which carries filter media. A head is adapted to discharge fluid onto the filter media. Due to the pivotable mounting, the frame including the conveyor can be moved to an upright position for cleaning the filter device.

4 Claims, 3 Drawing Figures

Patented Sept. 11, 1973

INVENTORS
ELMER F. HALVORSEN
HAROLD R. BYRD

BY Robert E. Walter

Patented Sept. 11, 1973

INVENTORS
ELMER F. HALVORSEN
HAROLD R. BYRD
BY Robert E. Walter
David E. Dougherty

LIQUID FILTER DEVICE

BACKGROUND OF THE INVENTION

This invention relates to a device for filtering liquids containing solids in suspension. In such devices of the prior art, a liquid flows onto a sheet of filter media supported above a tank by a perforated supporting conveyor through which the liquid may readily pass after filtering through the filter media. The conveyor is periodically moved so that the filter sheet presents a fresh portion thereof as the solids or sludge build up thereon during the filtering process. The filter sheet carries the solids to a receptacle for discharge.

It has been found that contaminants undesirably accumulate in the tank and conveyor portions of the filtering device. When filtering liquids such as cooking oil, fruit and vegetable juices or other liquids with filtering devices of the prior art, it has been difficult to effect the cleaning of these filtering devices and to maintain sanitary filtering conditions.

SUMMARY OF THE INVENTION

In the present invention, a liquid filter includes a tank for receiving filtered liquid. A frame which is disposed within the tank is pivotably mounted at one end of the tank and includes rollers which support a driven conveyor. The conveyor carries filter media which passes beneath a liquid discharge head. The entire frame can be pivoted to an upright position for cleaning the interior of the tank and the frame.

The filtering device of the present invention obviates many deficiencies of the prior art devices. Due to the pivotable mounting, the frame including the conveyor may be raised to an upright position whereby the filter device may be easily cleaned. Furthermore, due to the construction of the frame, the filtrate flows freely through the conveyor and into the tank without undesirable accumulations of food products.

BRIEF DESCRIPTION OF THE DRAWINGS

The drawings which illustrate a preferred embodiment of the present invention are as follows.

DETAILED DESCRIPTION OF A PREFERRED EMBODIMENT

Figure 1:
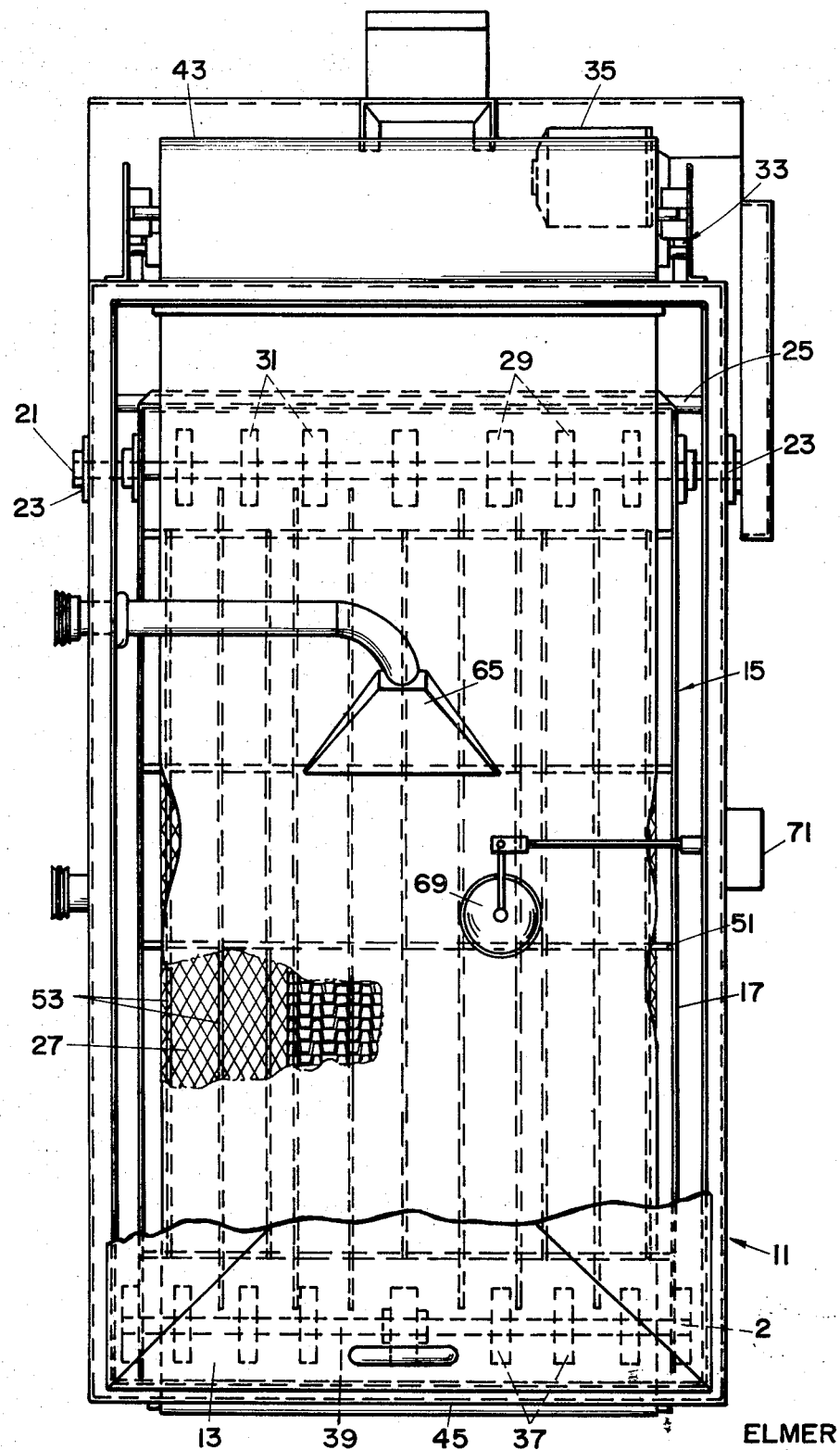
FIG. 1 is a top elevational view of the filter device shown partially in section.

In the drawings there is shown a tank or sump 11 which may comprise any receptacle for containing or receiving the filtered fluid. The tank 11 is of generally rectangular shape with vertical side walls and end walls. The bottom slopes downwardly from the walls to a center outlet or drain. The top of the tank 11 is provided with removable covers 13.

A rectangular frame 15 is pivotably mounted at one end thereof within the tank 11. The frame 15 includes a pair of parallel elongated members 17 jointed at the ends thereof by cross members 19. A shaft 21 which is journaled for rotation in suitable bearings 23 mounted on the sides of the tank 11 extends across the width of the tank 11. The shaft 21 extends through an opening in each of the elongated members 17 to form bearing surfaces for the pivotable mounting of the frame 15.

Figure 2:
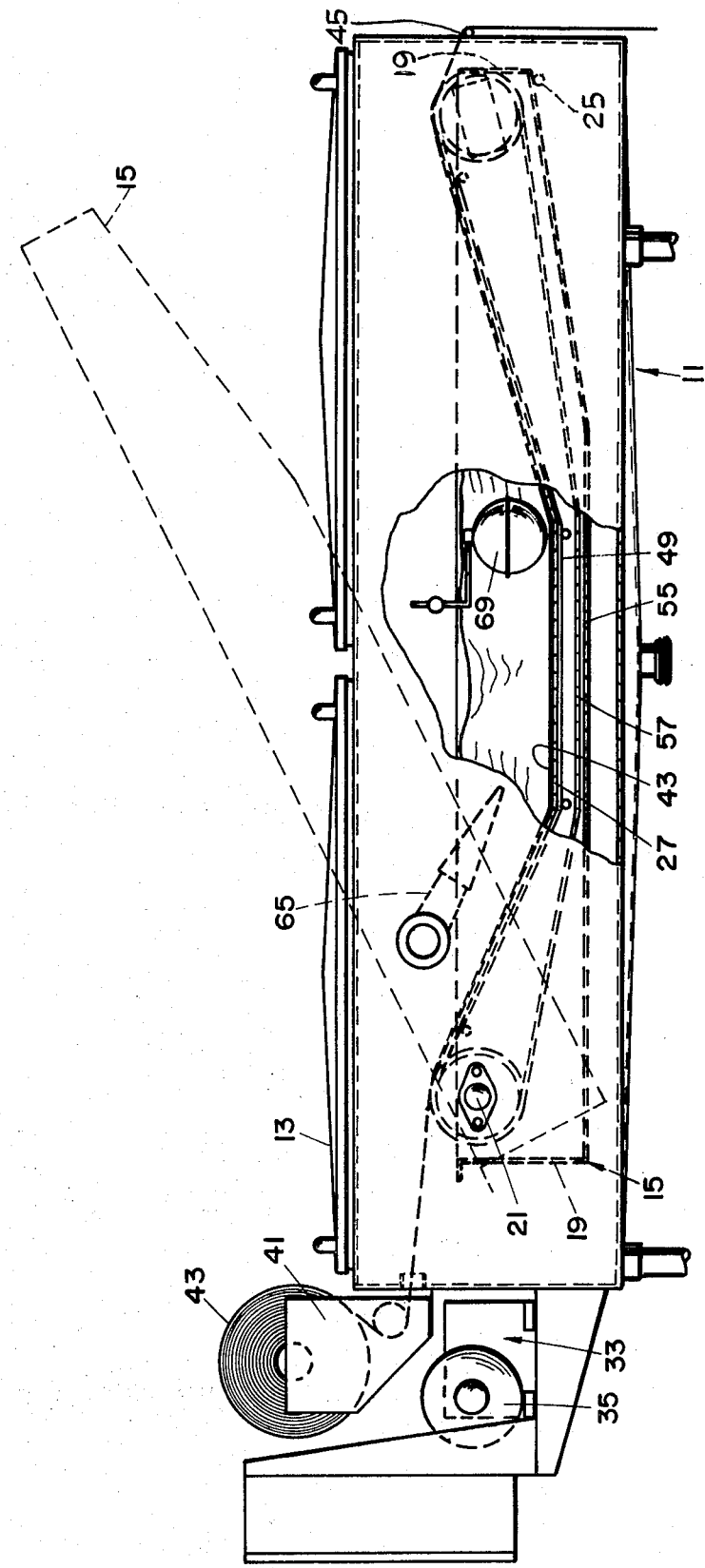
FIG. 2 is a side elevational view shown partially in section.
Figure 3:
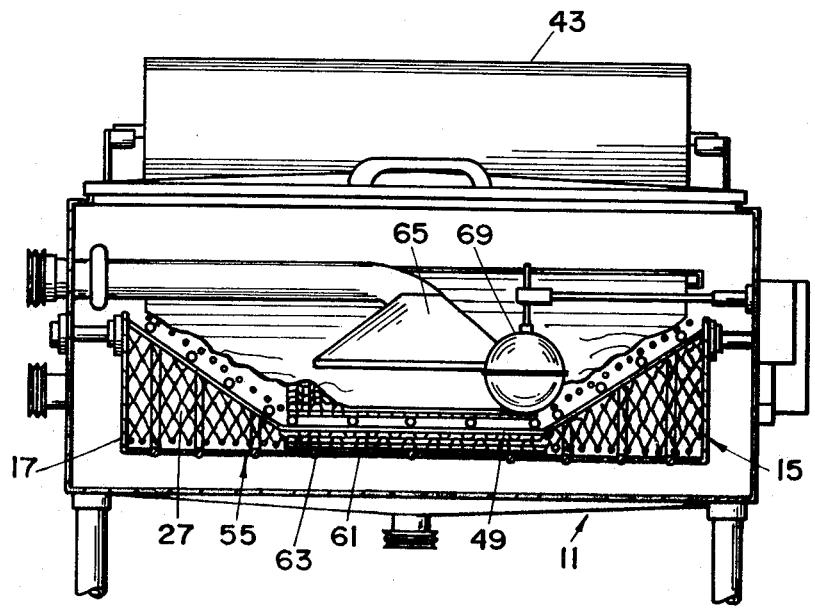
FIG. 3 is a transverse sectional view along line 2—2 of FIG. 2.

The pivotable mounting permits the frame to be raised to an upright position as shown by the broken line in FIG. 2. In the operational or lowered position the frame 15 rests on a bar 25 which is secured at each side of tank 11.

An endless perforated conveyor 27 formed of chain links or wire mesh is carried by spaced rollers 29 at either end of the frame. The rollers 29 are provided with a plurality of teeth for driving engagement with the conveyor. As illustrated in the drawings, one set of rollers 31 is rigidly mounted on shaft 21. Shaft 21 includes a portion projecting exteriorly to the tank 11 on which a drive sprocket is mounted. A suitable drive means 33 including an electric motor 35 is mounted to the tank 11 and connected to the drive sprocket through suitable gears and a chain or belt drive. Another set of rollers 37 is rigidly mounted to another shaft 39 which is rotatably mounted between the elongated members 17 so as to serve as idler rollers.

A pair of standards 41 extends upwardly from one end of the tank 11. A roll of filter media 43 preferably in sheet form is mounted between the standards 41 to permit unwinding of the filter media 43 onto the conveyor 27 as the conveyor 27 moves. The filter media 43 exits the tank 11 through a slot 45 in the end wall opposite the standards 41. A receptacle can be mounted on the tank 11 for receiving expended filter media 43 passing through the slot 45.

The frame 15 includes an upper support 49 for the drive section of the conveyor 27. The upper support 49 includes a plurality of rods 51 extending laterally across the frame 15 with one end of each of the rods 41 attached to an elongated member 17 and the other ends attached to the other elongated member 17. The rods 51 are sloped inwardly and downwardly from the ends thereof so as to provide a lifting surface over which the sides of the conveyor 27 are caused to rise for elevation to form sloping sidewalls for containing a liquid discharged upon the filtering media 43. The center portion of the rods 51 are generally level so as to form a flat inner area or pocket for containing the fluid to be filtered. A plurality of longitudinally extending rods 53 are connected at the ends to the respective cross members 19 and to the lateral rods 51 in intermediate positions to form a basketlike structure for supporting the upper driving portion of the conveyor 27.

The frame 15 includes a lower support 55 for the lower return section of the conveyor 27. The lower support 57 is similar to the upper support 49. The lower support 57 is formed from a plurality of interconnected lateral rods 61 and longitudinal rods 63. The use of rods for forming the upper and lower support surfaces are preferred. The rods are easily cleaned and reduce the amount of accumulated sludge which forms when other types of supporting surfaces are utilized. Within the tank 11 there is provided a material discharge head 65 connected with a conduit 67 leading from the source of material to be filtered. The head 65 discharges into the pocket or flat portion of the conveyor and is pivotable so that it may be moved when it is desired to raise the frame 15 for cleaning.

In operation, the arrangement is such that the contaminated fluid is directed into the pocket by the discharge head 65. The pocket formed by the sagging conveyor 27 and filter media 43 forms a puddle of liquid. The conveyor 27 and filter media 43 is initially at rest and liquid seeps through the filter media 43 into the tank 11 from which clean filter liquid is distributed.

The drive system is placed in operation when the motor 35 is energized upon elevation of the float 69 to a predetermined level which closes an electrical circuit (not shown) to the motor 35 by a switch 71. As a fresh filter media 43 is exposed in the pocket, the flow of liquid through the filter media 43 increases causing the level of fluid in the pocket to decrease to a predetermined level at which the switch 71 controlling the motor 35 is opened and the motor 35 stops. As the filtration process continues and the filter media 43 becomes clogged, the level of fluid in the pocket rises and the cycle is repeated.

While preferred embodiments of this invention have been described and illustrated, it is to be recognized that mofidications and variations thereof may be made without departing from the spirit and scope of this invention as described in the appended claims.

What is claimed is:

1. A liquid filtering device comprising a tank for receiving filtered liquid, means for dispensing a sheet of filter media mounted at one end of said tank, a frame disposed within said tank, means for pivotably mounting one end of said frame on said tank, a conveyor mounted on said frame for supporting said filter media, an upper support for the drive section of said conveyor, said support comprising a plurality of rods forming a pocket for containing unfiltered liquid, a lower support for the return section of said conveyor said support comprising a plurality of rods attached to said frame, said frame being movable to an upright position to expose said tank and said conveyor for cleaning.

2. A device according to claim 1 wherein said frame comprises a pair of elongated members, a pair of cross members joining said elongated members at the ends thereof, a roller at each end of said frame for mounting and driving said conveyor.

3. A device according to claim 2 including head for discharging the unfiltered fluid into the pocket.

4. A device according to claim 3 including means for driving said conveyor and a float extending into the pocket operably associated with said driving means for moving said conveyor when the unfiltered liquid reaches a predetermined level.

* * * * *